(12) United States Patent
Hsu et al.

(10) Patent No.: US 8,575,060 B2
(45) Date of Patent: Nov. 5, 2013

(54) METHOD OF FABRICATING FUEL REFORMING CATALYST FOR SOFC POWER GENERATING SYSTEM

(75) Inventors: Ning-Yih Hsu, Keelung (TW); Chun Ching Chien, Taipei (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 160 days.

(21) Appl. No.: 13/239,560

(22) Filed: Sep. 22, 2011

(65) Prior Publication Data

US 2013/0079217 A1 Mar. 28, 2013

(51) Int. Cl.
*B01J 23/00* (2006.01)
*B01J 23/40* (2006.01)
*B01J 23/42* (2006.01)
*B01J 23/44* (2006.01)

(52) U.S. Cl.
USPC ........... 502/304; 502/327; 502/337; 502/339; 502/355

(58) Field of Classification Search
USPC .......................... 502/304, 337, 339, 355, 327
See application file for complete search history.

(56) References Cited

U.S. PATENT DOCUMENTS

| 7,067,453 | B1 * | 6/2006 | Ming et al. | 502/304 |
| 7,919,424 | B2 * | 4/2011 | Kwak et al. | 502/151 |
| 2009/0214908 | A1 * | 8/2009 | Gorobinskiy et al. | 429/19 |
| 2010/0004120 | A1 * | 1/2010 | Kwak et al. | 502/151 |

OTHER PUBLICATIONS

Silva et al., "The effect of the use of cerium-doped alumina on the performance of Pt/CeO2/Al2O3 and Pt/CeZrO2/Al2O3 catalysts on the partial oxidation of methane," Applied Catalysis A: General 335 (2008) 145-152.*

Wang et al., "Role of CeO2 in Ni/CeO2-Al2O3 catalysts for carbon dioxide reforming of methane," Applied Catalysis B: Environmental 19 (1998) 267-277.*

* cited by examiner

*Primary Examiner* — Anthony J Zimmer
(74) *Attorney, Agent, or Firm* — Jackson IPG PLLC

(57) ABSTRACT

A fuel reforming catalyst is fabricated. The catalyst is used in solid oxide fuel cell. By using the catalyst, the hydrogen generation is enhanced with a great reforming ratio. In addition, the catalyst is coking-resistant and will not be broken into powder after a long time of use.

9 Claims, 6 Drawing Sheets

|  | $H_2$, % | $O_2$, % | $N_2$, % | $CH_4$, % | CO, % | $CO_2$, % |
|---|---|---|---|---|---|---|
| Comb-like catalyst | 57.5 | 0.0 | 12.0 | 4.0 | 19.8 | 5.6 |
| $Pt/CeO_2/\alpha\text{-}Al_2O_3$ | 68.8 | 0.0 | 13.1 | 0.0 | 17.3 | 7.0 |
| $Ni/CeO_2/\alpha\text{-}Al_2O_3$ | 68.0 | 0.0 | 13.1 | 0.0 | 17.1 | 6.8 |

| | Before sintering at 1400°C | After sintering at 1400°C |
|---|---|---|
| 3~6mm γ-$Al_2O_3$ | Hard structure, easily powderized surface | Powderized |
| 1mm γ-$Al_2O_3$ | Hard structure, smooth surface | Powderized |

US 8,575,060 B2

METHOD OF FABRICATING FUEL REFORMING CATALYST FOR SOFC POWER GENERATING SYSTEM

TECHNICAL FIELD OF THE INVENTION

The present invention relates to fuel reforming catalyst and, more particularly, relates to using $\alpha\text{-}Al_2O_3$ as support for fabricating a catalyst, e.g. $Pt/CeO_2/\alpha\text{-}Al_2O_3$, being coking-resistant and having long life.

DESCRIPTION OF THE RELATED ARTS

Clean green energy is an urgent need today. Solid oxide fuel cells (SOFC) are one solution with high efficiency and low $CO_2$ generation. However, known SOFCs have problems in support powderization and coking after reforming reaction of nickel (Ni)-based catalyst.

Ni has a periodical crystal structure to adhere $CH_4$ molecules for hydrogen generation by releasing hydrogen atoms. Because the Ni-based catalyst is cheap, it is usually used for reforming reaction in hydrogen reforming generation. Methods for fabricating the Ni-based catalyst include precipitation, co-precipitation and impregnation. The methods of precipitation and co-precipitation are more complex and severe than the method of impregnation on making bearing of support uniform. The method of impregnation uses $Ni(NO_3)_3$ dissolved in water and then porous grains of $Al_2O_3$ are impregnated with the solution. After drying, the reactants are sintered at a high temperature for resolving $Ni(NO_3)_3$ to be borne in the pores of grains of $Al_2O_3$. Finally, hydrogen is used for reduction to obtain the Ni-based catalyst. In principle, the smaller the grain is, the greater its activity is. Hence, the catalyst is usually borne on an inert material or a material helping the reaction. A good catalyst support can be obtained with Ni borne on $Al_2O_3$. Yet, when the density of Ni is too high, bulk-Ni may be easily formed and the bulk-Ni may be easily accumulated and sintered with activity of the catalyst lost. When there is no bulk-Ni in the catalyst support, a higher density of Ni in the catalyst obtains a better efficiency of the catalyst. Through temperature programmed reduction (TPR), when the density of Ni borne in the catalyst is higher, consumption of hydrogen is higher, which means more chains between Ni atoms and $Al_2O_3$ make distribution of Ni more uniform in the catalyst and the catalyst is less sintered with better hydrogen generation thus obtained. It is found that a catalyst bearing 8.3% of Ni (NiO: 10.56%) has a good hydrogen generation. Ni-based catalyst supports have long life times more than 900 hours (hr) and 300 hrs for ones having sizes of 1 millimeters (mm) and 3-6 mm, respectively. The performance of hydrogen generation of the catalysts is stable in SOFC. Yet, it is also found that the 1 mm and 3-6 mm catalyst supports are powderized after a reforming reaction at a temperature of about 800 Celsius degrees (° C.).

Generally, the catalyst support is chosen by its specific surface area (effective distribution of active spots), porous ratio (effective mass transference and heat transference), grain size (effective pressure drop) and mechanic strength. $Al_2O_3$ is the most widely used support as a catalyst. But, NiO and $\gamma\text{-}Al_2O_3$ would be easily reacted into $NiAl_2O_4$ at a high-temperature environment filled with oxygen. $NiAl_2O_4$ is not easily reduced and is inactive, which would affect the characteristics of the catalyst. In FIG. 6, $\gamma\text{-}Al_2O_3$ having sizes of 1 mm and 3-6 mm are powderized after being sintered at 400° C. It shows that these two $Al_2O_3$ supports do not fit in high-temperature reforming reaction.

In reforming reactions, traditional catalyst supports may be easily powderized with their activities lost; and gage pressure may be increased owing to coking and powderizing with their performances decreased. Hence, the prior arts do not fulfill all users' requests on actual use.

SUMMARY OF THE INVENTION

The main purpose of the present invention is to use $\alpha\text{-}Al_2O_3$ as support for fabricating a catalyst being coking-resistant and having long life.

To achieve the above purpose, the present invention is a method of fabricating a fuel reforming catalyst for a SOFC power generating system, comprising the steps of: (a) sintering $\gamma\text{-}Al_2O_3$ in a high-temperature furnace and providing air under a temperature increasing rate of 5° C. per minute (° C./min) to a temperature of 1080-1320° C. for a time period of 6-9 hours (hr); and, then, cooling down the sintering temperature to room temperature under a temperature decreasing rate of 5° C./min to obtain a catalyst of $\alpha\text{-}Al_2O_3$; (b) dissolving $Ce(NO_3)_3 \cdot 6H_2O$ in de-ionized water to obtain a $Ce(NO_3)_3$ solution; (c) impregnating the catalyst of $\alpha\text{-}Al_2O_3$ with the $Ce(NO_3)_3$ solution; (d) taking surplus water of the $Ce(NO_3)_3$ solution containing the catalyst of $\alpha\text{-}Al_2O_3$ out by a cyclotron vacuum concentrator to obtain $CeO_2/\alpha\text{-}Al_2O_3$; (e) drying the $CeO_2/\alpha\text{-}Al_2O_3$ in an oven; (f) sintering the dried $CeO_2/\alpha\text{-}Al_2O_3$ in a high-temperature furnace and providing air under a temperature increasing rate of 5° C./min to a temperature of 440-660° C. for a time period of 3-5 hrs; (g) dissolving dihydrogen hexachloroplatinate in de-ionized water to obtain a platinum solution; (h) impregnating the $CeO_2/\alpha\text{-}Al_2O_3$ with the platinum solution; (i) taking surplus water out of the platinum solution containing the $CeO_2/\alpha\text{-}Al_2O_3$ by a cyclotron vacuum concentrator; and (j) sintering the platinum solution containing $CeO_2/\alpha\text{-}Al_2O_3$ in a high-temperature furnace and providing air under a temperature increasing rate of 5° C./min to a temperature of 520-780° C. for a time period of 3-5 hr; and, then, cooling down the temperature to room temperature under a temperature decreasing rate of 5° C./min to obtain a catalyst of $Pt/CeO_2/\alpha\text{-}Al_2O_3$. Accordingly, a novel method of fabricating a fuel reforming catalyst for SOFC power generating system is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is a flow view showing the preferred embodiment according to the present invention;

FIG. 5 is a view showing the gas compositions at the outlet for the hydrogen reforming generation; and FIG. 6 is a view showing the statuses of the traditional $\gamma\text{-}Al_2O_3$ before and after sintering.

DESCRIPTION OF THE PREFERRED EMBODIMENT(S)

The following description of the preferred embodiment is provided to understand the features and the structures of the present invention.

Figure 1:
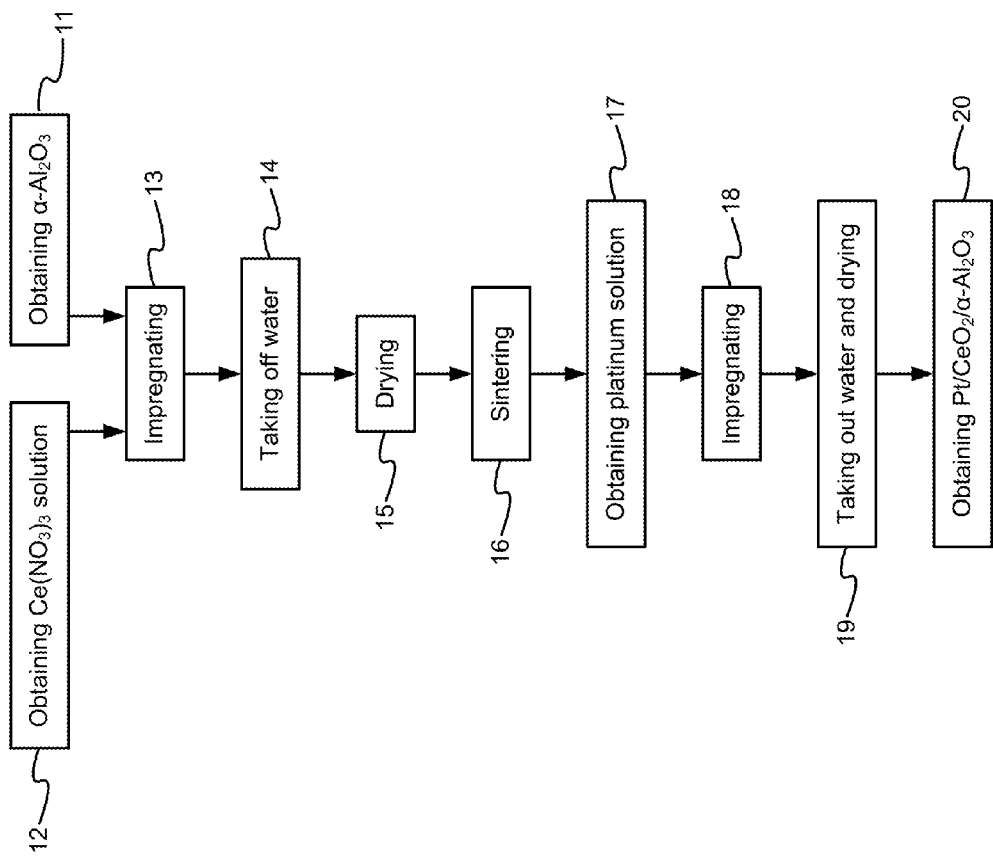

Please refer to FIG. 1, which is a flow view showing a preferred embodiment according to the present invention. As shown in the figure, the present invention is a method of fabricating a fuel reforming catalyst for a solid oxide fuel cell (SOFC) power generating system, where catalysts of Ni/CeO$_2$/α-Al$_2$O$_3$ and Pt/CeO$_2$/α-Al$_2$O$_3$ for hydrogen reforming are obtained. In a state of use, for fabricating 40 grams (g) of 2% Pt/10% CeO$_2$/α-Al$_2$O$_3$, the present invention comprises the following steps:

(a1) Obtaining α-Al$_2$O$_3$ 11: γ-Al$_2$O$_3$ is put into a high-temperature furnace and provided with 3 LPM of air. Then, the γ-Al$_2$O$_3$ is sintered under a temperature increasing rate of 5 Celsius degrees per minute (° C./min) to a temperature of 1200° C. for a time period of 8 hours (hr). Then, the temperature is cooled down to room temperature under a temperature decreasing rate of 5° C./min to obtain grains of a catalyst support of α-Al$_2$O$_3$.

(b1) Obtaining Ce(NO$_3$)$_3$ solution 12: 18.6 g of Ce(NO$_3$)$_3$.6H$_2$O is dissolved in de-ionized water to obtain a Ce(NO$_3$)$_3$ solution.

(c1) Impregnating 13: (c) A 40 g catalyst support of α-Al$_2$O$_3$ is impregnated with the Ce(NO$_3$)$_3$ solution for 12 hrs.

(d1) Taking off water 14: Surplus water of the Ce(NO$_3$)$_3$ solution containing grains of the catalyst support of α-Al$_2$O$_3$ is taken out by a cyclotron vacuum concentrator to obtain CeO$_2$/α-Al$_2$O$_3$.

(e1) Drying 15: CeO$_2$/α-Al$_2$O$_3$ obtained after taking out surplus water is put into an oven to be dried at a temperature of 110° C. for 24 hrs.

(f1) Sintering 16: CeO$_2$/α-Al$_2$O$_3$ is sintered in a high-temperature furnace and provided with 3 PLM under a temperature increasing rate of 5° C./min to a temperature of 550° C. for a time period of 4 hrs.

(g1) Obtaining platinum solution 17: 21.25 g of dihydrogen hexachloroplatinate is dissolved in 50 g of de-ionized water to obtain a platinum solution.

(h1) Impregnating 18: 40 g of CeO$_2$/α-Al$_2$O$_3$ is impregnated with the platinum solution for 12 hrs.

(i1) Taking out water and drying 19: Surplus water of the platinum solution containing CeO$_2$/α-Al$_2$O$_3$ is taken out by a cyclotron vacuum concentrator and remaining solution is put into an oven to be dried at a temperature of 110° C. for 24 hrs.

(j1) Obtaining Pt/CeO$_2$/α-Al$_2$O$_3$ 20: The platinum solution containing CeO$_2$/α-Al$_2$O$_3$ is sintered in a high-temperature furnace and provided with air under a temperature increasing rate of 5° C./min to a temperature of 650° C. for a time period of 4 hr. Then, the temperature is cooled down to room temperature under a temperature decreasing rate of 5° C./min to obtain a catalyst of Pt/CeO$_2$/α-Al$_2$O$_3$.

In another state of use, for fabricating 40 g of 8.3% Ni/10% CeO$_2$/α-Al$_2$O$_3$, the present invention comprises the following steps:

(a2) γ-Al$_2$O$_3$ is put into a high-temperature furnace and provided with 3 LPM. Then, the γ-Al$_2$O$_3$ is sintered under a temperature increasing rate of 5° C./min to a temperature of 1200° C. for a time period of 8 hrs. Then, the temperature is cooled down to a room temperature under a temperature decreasing rate of 5° C./min to obtain grains of a catalyst support of α-Al$_2$O$_3$.

(b2) 18.6 g of Ce(NO$_3$)$_3$.6H$_2$O is dissolved in de-ionized water to obtain a Ce(NO$_3$)$_3$ solution.

(c2) The 40 g catalyst support of α-Al$_2$O$_3$ is impregnated with the Ce(NO$_3$)$_3$ solution for 12 hrs.

(d2) Surplus water of the Ce(NO$_3$)$_3$ solution containing grains of the catalyst support of α-Al$_2$O$_3$ is taken out by a cyclotron vacuum concentrator to obtain CeO$_2$/α-Al$_2$O$_3$.

(e2) The CeO$_2$/α-Al$_2$O$_3$ obtained after taking out surplus water is put into an oven to be dried at a temperature of 110° C. for 24 hrs.

(f2) CeO$_2$/α-Al$_2$O$_3$ is sintered in a high-temperature furnace and provided with 3 PLM of air under a temperature increasing rate of 5° C./min to a temperature of 550° C. for a time period of 4 hrs.

(g2) 21.25 g of Ni(NO$_3$)$_3$.6H$_2$O is dissolved in 50 g of de-ionized water to obtain a Ni(NO$_3$)$_3$ solution.

(h2) 40 g of CeO$_2$/α-Al$_2$O$_3$ is impregnated with the Ni(NO$_3$)$_3$ solution for 12 hrs.

(i2) Surplus water of the Ni(NO$_3$)$_3$ solution containing CeO$_2$/α-Al$_2$O$_3$ is taken out by a cyclotron vacuum concentrator and remaining solution is put into an oven to be dried at a temperature of 110° C. for 24 hrs.

(j2) The Ni(NO$_3$)$_3$ solution containing CeO$_2$/α-Al$_2$O$_3$ is sintered in a high-temperature furnace and provided with air under a temperature increasing rate of 5° C./min to a temperature of 650° C. for a time period of 4 hr. Then, the temperature is cooled down to room temperature under a temperature decreasing rate of 5° C./min to obtain a catalyst of Ni/CeO$_2$/α-Al$_2$O$_3$.

Since the reforming reaction by catalyst may make the catalyst become inactive owing to the support used, γ-Al$_2$O$_3$ is made into the crystalline phase of α-Al$_2$O$_3$ at a temperature of 1200° C. for reducing the possibility of forming spinels of NiAl$_2$O$_4$.

Figure 2:
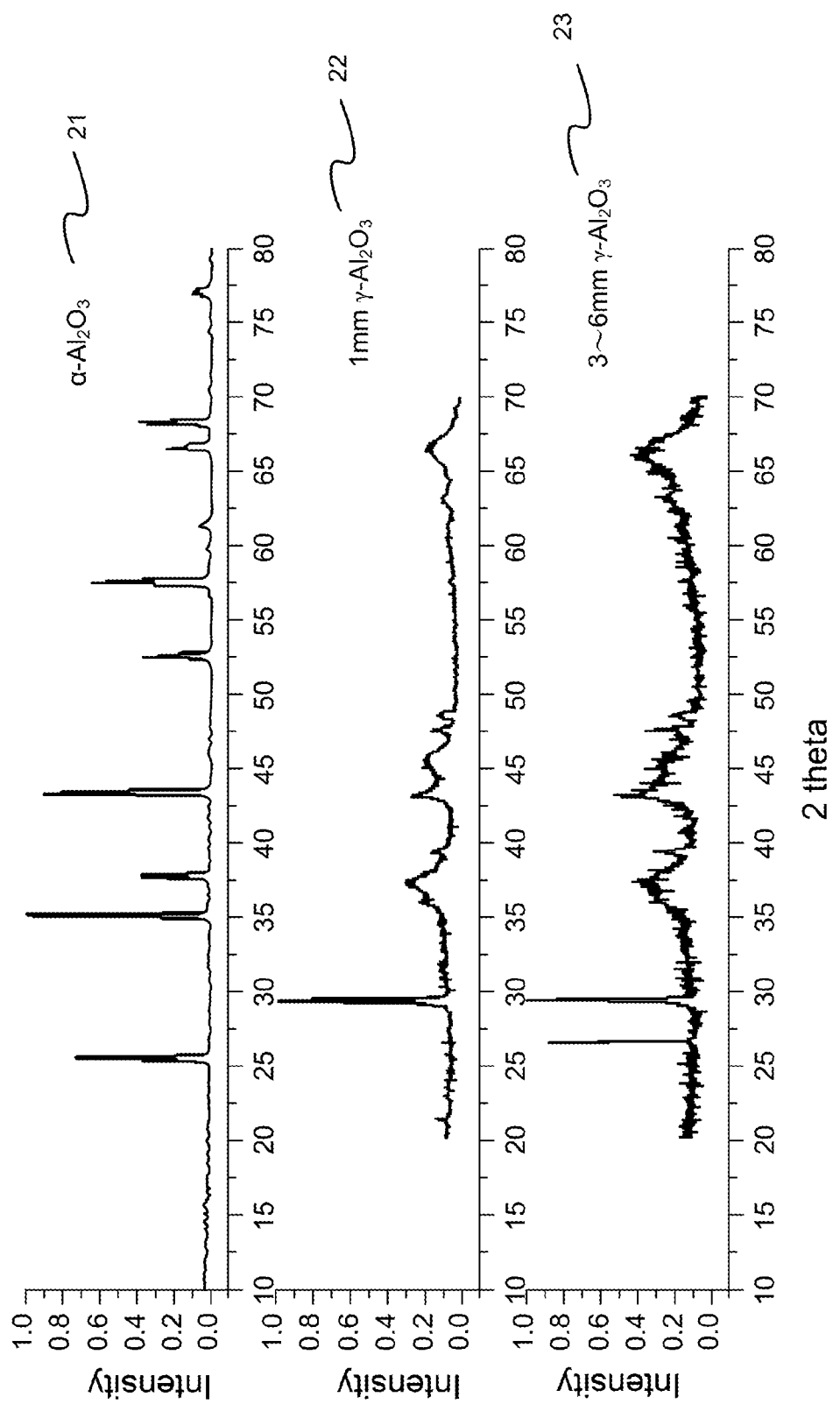
FIG. 2 is a view showing the crystalline phase of the catalyst supports.

Please refer to FIG. 2, which is a view showing crystalline phase of catalyst supports. As shown in the figure, curves of crystalline phase of catalyst supports are obtained through X-ray diffraction (XRD). The first curve 21 shows the XRD curve of α-Al$_2$O$_3$ obtained through the present invention. The second and the third curves 22,23 shows the XRD curves of traditional 1 mm and 3-6 mm Ni-based catalysts of γ-Al$_2$O$_3$. In the figures, the curves of the traditional catalysts are almost the same regardless of their sizes. But, the curve of the α-Al$_2$O$_3$ obtained through the present invention shows a more obvious peak, which proves to be a better support.

Figure 3:
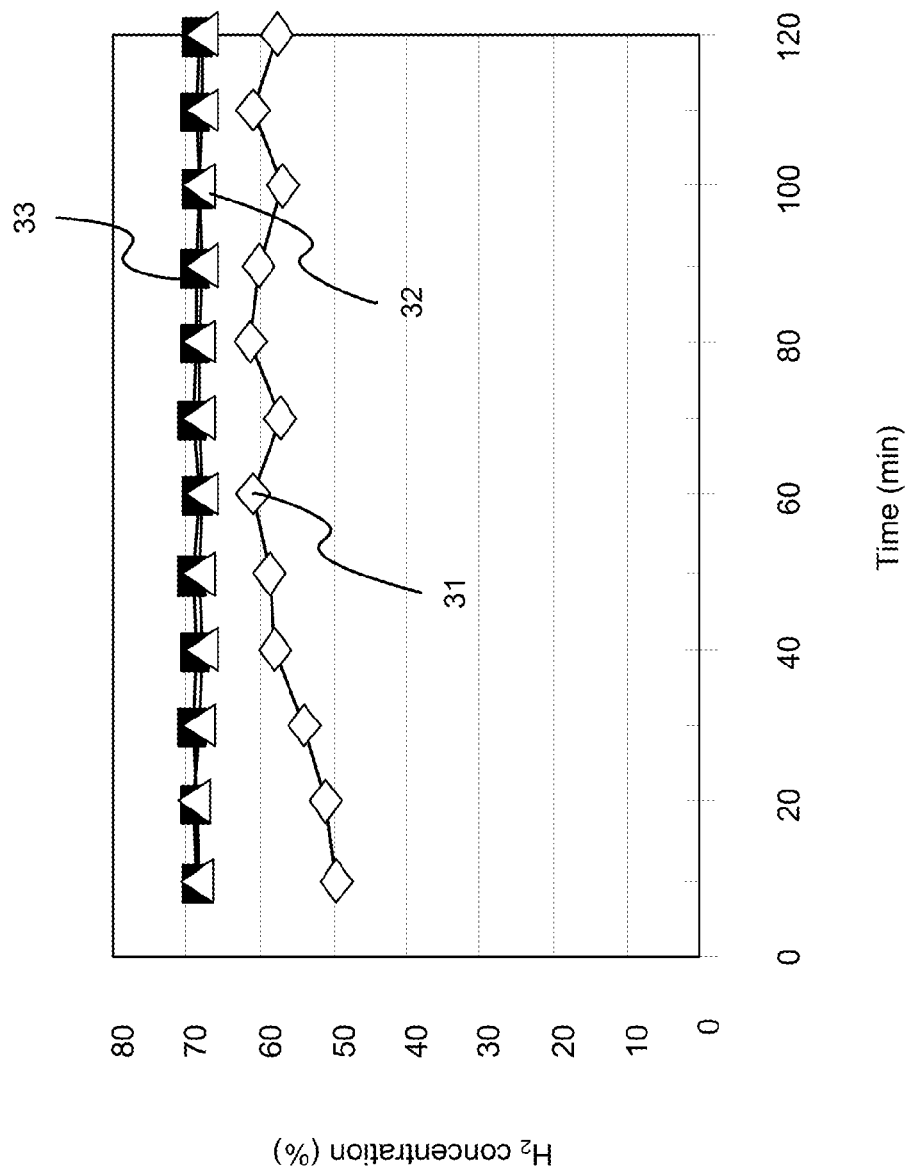
FIG. 3 is a view showing the hydrogen generation densities of the catalysts.

Please refer to FIG. 3 and FIG. 5, which are a view showing the hydrogen generation densities of the catalysts; and a view showing gas compositions at outlet for hydrogen reforming generation respectively. As shown in the figures, two catalysts of Ni/CeO$_2$/α-Al$_2$O$_3$ and Pt/CeO$_2$/α-Al$_2$O$_3$ and a traditional catalyst are tested via reforming reaction through autothermal reaction. Reactants including CH$_4$, air and water (H$_2$O) are mixed for hydrogen generation with the catalysts by reforming reaction at a high temperature. The ratios of H$_2$O/CH$_4$ and O/C are fixed. The reaction is processed with the following conditions: the ratios of H$_2$O/CH$_4$ and O/C are H$_2$O/CH$_4$=2, O/C=0.35, respectively; the reaction temperature is about 780-800° C.; and air is provided at a rate about 2.5 L/g-h. The traditional catalyst made of Pt, Rh and Pd is obtained. Because the honeycomb is cut into accumulation of large particles with more interspace, the residence time for the reactants may be short so as to result in incomplete reaction. Hence, in 120 minutes (min) for reforming reaction, a first hydrogen generation curve 31 for the catalyst of Pt—Rh—Pd shows a lower hydrogen density at a gas generating outlet. Instead, the other two catalysts of Ni/CeO$_2$/α-Al$_2$O$_3$ and Pt/CeO$_2$/α-Al$_2$O$_3$ have longer residence times owing to an irregular stacking of grains although the α-Al$_2$O$_3$ support used has a small specific surface area. In the 120 min for reforming reaction, the second and the third hydrogen generation curves 32,33 for the catalysts of Ni/CeO$_2$/α-Al$_2$O$_3$ and Pt/CeO$_2$/α-Al$_2$O$_3$ shows hydrogen densities higher than 68% at gas generating outlet with no obvious declining tendency. In FIG. 5, the traditional catalyst has lower hydrogen generation density and gas compositions at the outlet contain about 4% $CH_4$. But, the catalysts of $Ni/CeO_2/\alpha-Al_2O_3$ and $Pt/CeO_2/\alpha-Al_2O_3$ have no $CH_4$ at the outlet, which shows 99% $CH_4$ conversion rate. Hence, the catalysts of $Ni/CeO_2/\alpha-Al_2O_3$ and $Pt/CeO_2/\alpha-Al_2O_3$ fabricated according to the present invention have higher activities on hydrogen generation.

Figure 4:
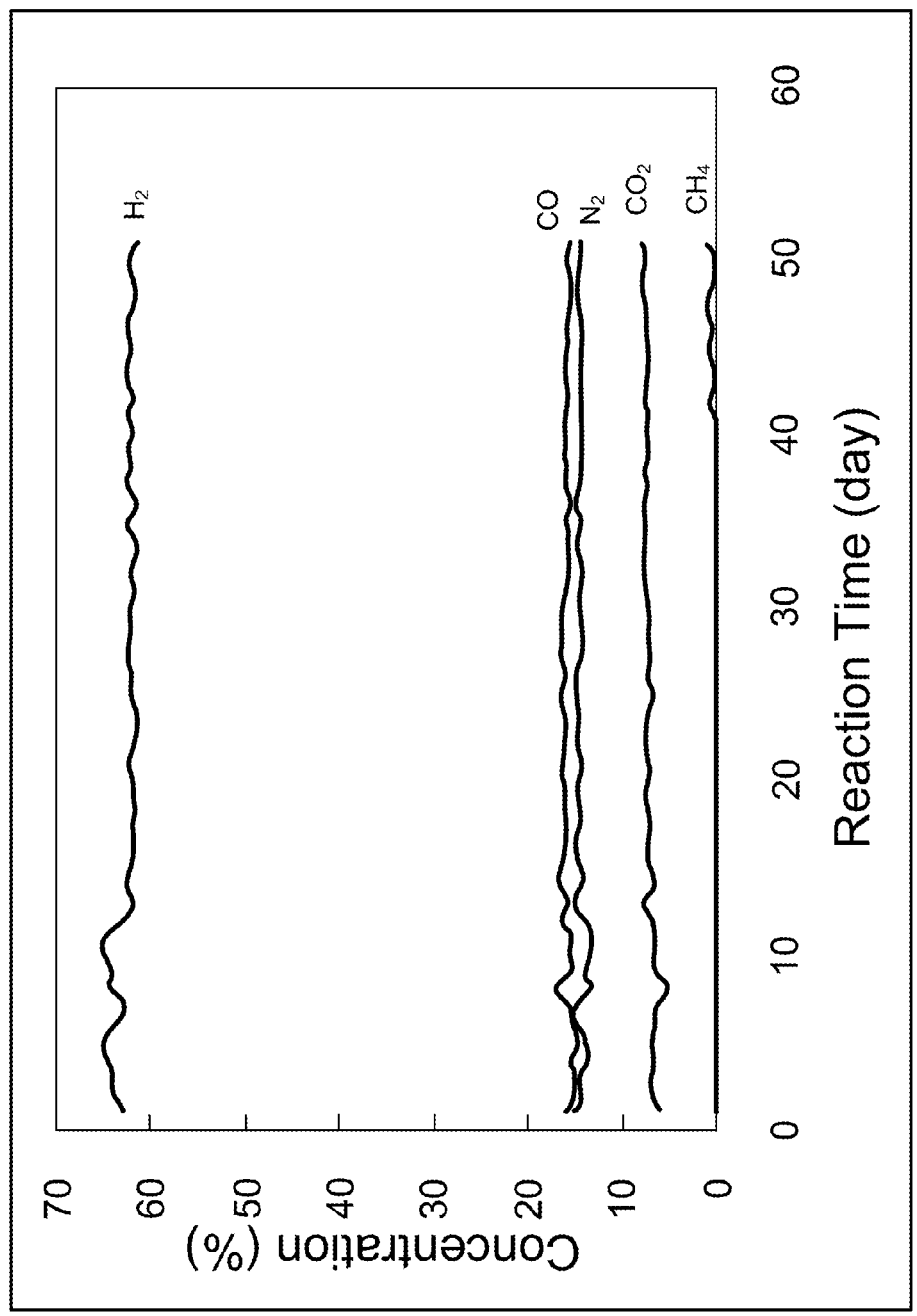
FIG. 4 is a view showing the gas reforming durability.

Please refer to FIG. 4, which is a view showing gas reforming durability. As shown in the figure, a reforming catalyst is used for SOFC. The reforming catalyst is not powderized after being used for 1000 hrs and remains coke-free or active. Hence, the reforming catalyst using $\alpha-Al_2O_3$ support is coking-resistant and has long life.

The reforming catalysts fabricated through the present invention uses $\alpha-Al_2O_3$ as support for high-temperature resistance and good hardness. The catalysts of $Pt/CeO_2/\alpha-Al_2O_3$ and $Ni/CeO_2/\alpha-Al_2O_3$ thus fabricated have good performances for hydrogen generation, where the hydrogen generation density reaches about 68% after 120 min with a conversion rate higher than 99%; and the catalysts all have an effective durability to be used more than 1000 hrs.

To sum up, the present invention is a method of fabricating a fuel reforming catalyst for a SOFC power generating system, where $\alpha-Al_2O_3$ is used as support with high-temperature resistance and good hardness; the catalysts of $Pt/CeO_2/\alpha-Al_2O_3$ and $Ni/CeO_2/\alpha-Al_2O_3$ thus fabricated have good performance for hydrogen generation; the hydrogen generation density reaches about 68% after 120 min with a conversion rate higher than 99%; and the catalysts are coking-resistant and have long life.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a fuel reforming catalyst for a solid oxide fuel cell (SOFC) power generating system, comprising the steps of:
   (a) sintering $\gamma-Al_2O_3$ in a high-temperature furnace provided with air under a temperature increasing rate of 5 Celsius degrees per minute (° C./min) to a temperature of 1080-1320° C. for a time period of 6-9 hours (hr); and, then, cooling down said temperature to room temperature under a temperature decreasing rate of 5° C./min to obtain a catalyst of $\alpha-Al_2O_3$;
   (b) dissolving $Ce(NO_3)_3 \cdot 6H_2O$ in de-ionized water to obtain a $Ce(NO_3)_3$ solution;
   (c) impregnating said catalyst of $\alpha-Al_2O_3$ with said $Ce(NO_3)_3$ solution;
   (d) taking surplus water from said $Ce(NO_3)_3$ solution containing said catalyst of $\alpha-Al_2O_3$ by a cyclotron vacuum concentrator to obtain $CeO_2/\alpha-Al_2O_3$;
   (e) drying the $CeO_2/\alpha-Al_2O_3$ in an oven;
   (f) sintering the $CeO_2/\alpha-Al_2O_3$ in a high-temperature furnace provided with air under a temperature increasing rate of 5° C./min to a temperature of 440-660° C. for a time period of 3-5 hrs;
   (g) dissolving dihydrogen hexachloroplatinate in de-ionized water to obtain a platinum solution;
   (h) impregnating $CeO_2/\alpha-Al_2O_3$ with said platinum solution;
   (i) taking surplus water out of said platinum solution containing $CeO_2/\alpha-Al_2O_3$ by a cyclotron vacuum concentrator; and
   (j) sintering said platinum solution containing $CeO_2/\alpha-Al_2O_3$ in a high-temperature furnace provided with air under a temperature increasing rate of 5° C./min to a temperature of 520-780° C. for a time period of 3-5 hr; and, then, cooling down said temperature to room temperature under a temperature decreasing rate of 5° C./min to obtain a catalyst of $Pt/CeO_2/\alpha-Al_2O_3$.

2. The method according to claim 1, wherein said catalyst of $Pt/CeO_2/\alpha-Al_2O_3$ has an effective durability over 1000 hrs and a $CH_4$ conversion higher than 99% in a reforming reaction.

3. The method according to claim 1, wherein, in step (a), 3 LPM of air is provided to process sintering under a temperature increasing rate of 5° C./min to a temperature of 1200° C. for a time period of 8 hrs.

4. The method according to claim 1, wherein, in step (c), said impregnating is processed for 12 hrs.

5. The method according to claim 1, wherein, in step (f), 3 LPM of air is provided to process sintering under a temperature increasing rate of 5° C./min to a temperature of 550° C. for a time period of 4 hrs.

6. The method according to claim 1, wherein, in step (h), said impregnating is processed for 12 hrs.

7. The method according to claim 1, wherein, in step (j), 3 LPM of air is provided to process sintering under a temperature increasing rate of 5° C./min to a temperature of 650° C. for a time period of 4 hrs.

8. The method according to claim 1, wherein said catalyst of $\alpha-Al_2O_3$ has a cylinder shape with a diameter of 3 millimeters (mm).

9. A method of fabricating a fuel reforming catalyst for a solid oxide fuel cell (SOFC) power generating system, comprising the steps of:
   (a) sintering $\gamma-Al_2O_3$ in a high-temperature furnace provided with air under a temperature increasing rate of 5 Celsius degrees per minute (° C./min) to a temperature of 1080-1320° C. for a time period of 6-9 hours (hr); and, then, cooling down said temperature to room temperature under a temperature decreasing rate of 5° C./min to obtain a catalyst of $\alpha-Al_2O_3$;
   (b) dissolving $Ce(NO_3)_3 \cdot 6H_2O$ in de-ionized water to obtain a $Ce(NO_3)_3$ solution;
   (c) impregnating said catalyst of $\alpha-Al_2O_3$ with said $Ce(NO_3)_3$ solution;
   (d) taking surplus water of said $Ce(NO_3)_3$ solution containing said catalyst of $\alpha-Al_2O_3$ out by a cyclotron vacuum concentrator to obtain $CeO_2/\alpha-Al_2O_3$;
   (e) drying the $CeO_2/\alpha-Al_2O_3$ in an oven;
   (f) sintering $CeO_2/\alpha-Al_2O_3$ into a high-temperature furnace provided with air under a temperature increasing rate of 5° C./min to a temperature of 440-660° C. for a time period of 3-5 hrs;
   (g) dissolving $Ni(NO_3)_3 \cdot 6H_2O$ in de-ionized water to obtain a nickel solution;
   (h) impregnating $CeO_2/\alpha-Al_2O_3$ with said nickel solution;
   (i) taking surplus water out of said nickel solution containing $CeO_2/\alpha-Al_2O_3$ by a cyclotron vacuum concentrator; and
   (j) sintering said nickel solution containing $CeO_2/\alpha-Al_2O_3$ in a high-temperature furnace provided with air under a temperature increasing rate of 5° C./min to a temperature of 520-780° C. for a time period of 3-5 hr; and, then, cooling down said temperature to room temperature under a temperature decreasing rate of 5° C./min to obtain a catalyst of $Ni/CeO_2/\alpha-Al_2O_3$.

* * * * *